US009757780B2

(12) United States Patent
Sakamoto et al.

(10) Patent No.: US 9,757,780 B2
(45) Date of Patent: Sep. 12, 2017

(54) ELECTRIC RESISTANCE WELDED STEEL PIPE EXCELLENT IN DEFORMABILITY AND FATIGUE PROPERTIES AFTER QUENCHING

(75) Inventors: Shinya Sakamoto, Tokyo (JP); Takuya Hara, Tokyo (JP); Yoshio Terada, Tokyo (JP); Takafumi Sebayashi, Tokyo (JP); Itsuroh Hiroshige, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 1004 days.

(21) Appl. No.: 13/256,357

(22) PCT Filed: Mar. 25, 2010

(86) PCT No.: PCT/JP2010/055987
§ 371 (c)(1),
(2), (4) Date: Sep. 13, 2011

(87) PCT Pub. No.: WO2010/110490
PCT Pub. Date: Sep. 30, 2010

(65) Prior Publication Data
US 2012/0000567 A1   Jan. 5, 2012

(30) Foreign Application Priority Data

Mar. 25, 2009 (JP) ................................. 2009-074840
Sep. 10, 2009 (JP) ................................. 2009-209113

(51) Int. Cl.
| | | |
|---|---|---|
| *B21C 37/08* | (2006.01) | |
| *C22C 38/00* | (2006.01) | |
| *C21D 9/08* | (2006.01) | |
| *C22C 38/02* | (2006.01) | |
| *C22C 38/04* | (2006.01) | |

(52) U.S. Cl.
CPC ............... *B21C 37/08* (2013.01); *C21D 9/08* (2013.01); *C22C 38/002* (2013.01); *C22C 38/02* (2013.01); *C22C 38/04* (2013.01)

(58) Field of Classification Search
CPC ....... C22C 38/002; C22C 38/02; C22C 38/04; C22C 38/12; C22C 38/14; B21C 37/08
USPC .......... 148/320, 330; 420/84, 121, 123, 124, 420/126, 127; 138/177
See application file for complete search history.

(56) References Cited

U.S. PATENT DOCUMENTS

| | | |
|---|---|---|
| 5,213,633 A | 5/1993 | Hada et al. |
| 2007/0144632 A1 | 6/2007 | Toyoda et al. |

FOREIGN PATENT DOCUMENTS

| | | |
|---|---|---|
| EP | 1 533 392 A1 | 6/2005 |
| EP | 1 889 997 A1 | 2/2008 |
| JP | 02-290947 A | 11/1990 |
| JP | 5-5157 A | 1/1993 |
| JP | 5-117806 A | 5/1993 |
| JP | 06-44584 A | 2/1994 |
| JP | 07-173536 A | 7/1995 |
| JP | 11-269552 A | 10/1999 |
| JP | 11-269553 A | 10/1999 |
| JP | 2004-124228 A | 4/2004 |
| JP | 2004292922 A * | 10/2004 |
| JP | 2006-066478 A | 3/2005 |
| JP | 2005-171337 A | 6/2005 |
| JP | 2006-9141 A | 1/2006 |
| JP | 2007-246956 A | 9/2007 |

OTHER PUBLICATIONS

Yamazaki et al., English machine translation of JP 2004-124228 from IDS, Apr. 2004, p. 1-13.*
Kitazawa et al., English machine translation of JP 2004-292922, Oct. 2004, p. 1-12.*
International Search Report, dated Jun. 15, 2010, issued in PCT/JP2010/055987.

* cited by examiner

*Primary Examiner* — Roy King
*Assistant Examiner* — Caitlin Kiechle
(74) *Attorney, Agent, or Firm* — Birch, Stewart, Kolasch & Birch, LLP

(57) ABSTRACT

Electric resistance welded steel pipe excellent in deformability and fatigue properties after quenching which enables working into complicated shapes without spheroidization and which improves the fatigue properties after cold working and quenching without carburization are provided. The electric resistance welded steel pipe is characterized by containing, by mass %, C: 0.15 to 0.55%, Si: 0.01 to 0.30%, Mn: 0.5 to 1.5%, Ca: 0.0010 to 0.0030%, S: 0.0005 to 0.0050%, and O: 0.0005 to 0.0050%, having contents of Ca, O, and S satisfying $0.10 \leq [Ca](1-124[O])/1.25[S] \leq 2.50$, having Ca-based inclusions present at the base material and electric resistance weld zone with an average particle size of 1.0 to 10 μm and a density of 3 to 300/mm$^2$, and having a difference ΔHv of the maximum hardness of the electric resistance weld zone and the average hardness of the base material part satisfying 100 to 500.

6 Claims, No Drawings ies of the inventors, there is the 
ELECTRIC RESISTANCE WELDED STEEL PIPE EXCELLENT IN DEFORMABILITY AND FATIGUE PROPERTIES AFTER QUENCHING

TECHNICAL FIELD

The present invention relates to electric resistance welded steel pipe excellent in deformability and fatigue properties after quenching suitable for materials for auto parts, machine structure parts, etc.

BACKGROUND ART

In recent years, along with the improvement in performance of automobiles and machine structures, much higher fatigue properties, more complicated part shapes, and more improved deformability of the steel material have been strongly demanded. The steel pipe which is used as material for auto parts, machine structure parts, etc. is cold worked, then machined to obtain the final part shape and adjusted in strength by subsequent quenching. Hardened auto parts and machine structure parts are required to have strength and fatigue properties.

To raise the strength of steel pipe by quenching, it is necessary to raise the C content of the steel pipe material. However, high carbon steel is inferior in deformability, so the method of lowering the strength by spheroidization heat treatment has been proposed (for example, see PLT's 1 to 4).

On the other hand, to improve the fatigue properties, in general it is effective to increase the hardness or strength or to impart residual stress of compression. Up until now, the method of using carburization to increase the hardness and strength of the surface layer part so as to improve the fatigue properties (see PLT 5) has been proposed.

However, in recent years, from the viewpoint of lower costs and production efficiency, electric resistance welded steel pipe excellent in deformability which can be worked into complicated shapes even after omitting spheroidization heat treatment has been demanded. Further, it has been demanded to improve the fatigue properties of parts after quenching without carburization etc.

Furthermore, in electric resistance welded steel pipe used for applications in which deformability is demanded, in particular, Ca is added for controlling the morphology of MnS. Further, to make the quality of the base material and the weld zone uniform, the practice has been to use electric resistance welding to make the pipe, then perform normalizing (heating to the Ac3 transformation point or more and air cooling) or other heat treatment.

However, when omitting the heat treatment after pipemaking from the viewpoint of lower costs and production efficiency, according to studies of the inventors, there is the problem of deterioration of the deformability. In steel to which Ca is added, it is demanded that the deformability not be impaired even if omitting the heat treatment after pipemaking.

CITATION LIST

Patent Literature

PLT 1: Japanese Patent Publication (A) No. 11-269552
PLT 2: Japanese Patent Publication (A) No. 11-269553
PLT 3: Japanese Patent Publication (A) No. 2006-9141
PLT 4: Japanese Patent Publication (A) No. 2007-246956
PLT 5: Japanese Patent Publication (A) No. 5-117806

SUMMARY OF INVENTION

Solution to Problem

The present invention was made in consideration of this situation and provides electric resistance welded steel pipe excellent in deformability and fatigue properties after quenching which can be worked into a complicated shape without spheroidization, which can be raised in cold deformability and fatigue properties after quenching without carburization, and furthermore which is not impaired in deformability even if omitting heat treatment after pipemaking.

Solution to Problem

The inventors studied the effects of inclusions forming the starting points of cracks at the time of cold forging and other working and cracks in a fatigue test.

As a result, they discovered that by controlling the morphology of the oxides and sulfides and other calcium(Ca)-based inclusions present at the base material and weld zone of electric resistance welded steel pipe, deformability is secured even if omitting heat treatment after pipemaking and that thereby electric resistance welded steel pipe improved in the fatigue properties after quenching can be obtained.

The gist of the present invention, made in this way, is as follows:

(1) An electric resistance welded steel pipe excellent in deformability and fatigue properties after quenching characterized by containing, by mass %, C: 0.15 to 0.55%, Si: 0.01 to 0.30%, Mn: 0.5 to 1.5%, Ca: 0.0010 to 0.0030%, S: 0.0005 to 0.0050%, and O: 0.0005 to 0.0050%, restricting P: 0.020% or less, N: 0.0050% or less, and Al: 0.050% or less, having a balance of Fe and impurities, having contents of Ca, O, and S satisfying $$0.10 \leq [Ca](1-124[O])/1.25[S] \leq 2.50,$$

having Ca-based inclusions present at a base material and electric resistance weld zone with an average particle size of 1.0 to 10 μm and density of 3 to 300/mm², and having a difference ΔHv of a maximum hardness of the electric resistance weld zone and average hardness of a base material part of $$100 \leq \Delta Hv \leq 500.$$

(2) The electric resistance welded steel pipe excellent in deformability and fatigue properties after quenching as set forth in (1), further containing, by mass, Mo: 0.25% or less.

(3) The electric resistance welded steel pipe excellent in deformability and fatigue properties after quenching as set forth in (1) or (2), further containing, by mass %, Ti: 0.030% or less and B: 0.0050% or less.

(4) The electric resistance welded steel pipe excellent in deformability and fatigue properties after quenching as set forth in (1) or (2), further containing, by mass %, one or more of Ni: 1.00% or less, Cu: 1.00% or less, Cr: 1.50% or less, Mo: less than 0.05%, Nb: 0.050% or less, and V: 0.040% or less.

(5) The electric resistance welded steel pipe excellent in deformability and fatigue properties after quenching as set forth in (1) or (2), wherein the base material has a thickness of 4 to 12 mm.

Advantageous Effects of Invention

According to the present invention, even if omitting heat treatment after pipemaking, electric resistance welded steel pipe having excellent deformability and further excellent in strength after quenching and fatigue properties is obtained and provision of complicated shapes of auto parts and machine structure parts high in strength and excellent in fatigue properties can be provided, so the contribution to industry is extremely remarkable.

DESCRIPTION OF EMBODIMENTS

The inventors discovered that the starting points of cracks at the time of cold working large C content electric resistance welded steel pipe or fatigue cracks of hardened parts are the calcium oxide (CaO), calcium sulfide (CaS), and other calcium-based inclusions (Ca-based inclusions) present at the base material and weld zone of the steel pipe.

The inventors proceeded with further studies and succeeded in controlling the contents of Ca, O, and S so as to make the calcium-based inclusions finer and improve the deformability and the fatigue properties after quenching of the electric resistance welded steel pipe.

Below, the electric resistance welded steel pipe excellent in deformability and fatigue properties after quenching of the present invention will be explained. In the present invention, the chemical components and the morphology and density of the calcium (Ca)-based oxides and sulfides are limited under specific conditions. First, the chemical components of the steel used for the base materials of the steel pipes will be explained. The % of the content is the mass %.

C: 0.15 to 0.55%,

C is an element which is necessary for securing the strength and hardenability and is made a content of 0.15 to 0.50% in range. The carbon content has to be made 0.15% or more for securing the strength and the hardenability. Further, to raise the strength, it is more preferable to make the carbon content 0.20% or more, more preferably 0.25% or more.

On the other hand, if the carbon content exceeds 0.55%, the steel becomes too hard and deterioration of the deformability or deterioration of the machineability and toughness is incurred, so the upper limit value is preferably 0.55% or less. Further, this upper limit value is preferably 0.50% or less, more preferably 0.45% or less, still more preferably 0.40% or less.

Si: 0.01 to 0.30%,

Si is an element which not only acts as a deoxidizing agent, but also is effective in raising the strength. Its content is made 0.01 to 0.30% in range. The lower limit value of the Si content is preferably made 0.01% or more, more preferably 0.10% or more, and still more preferably 0.15% or more.

On the other hand, if the Si content is over 0.30%, along with the rise in strength, the ductility falls and deterioration of the deformability is incurred. Further, reaction products easily form at the electric resistance weld zone of the electric resistance welded steel pipe and the quality of the electric resistance weld zone is remarkably degraded. Therefore, the upper limit value of the Si content is preferably 0.30% or less, more preferably 0.25% or less, still more preferably 0.20% or less.

Mn: 0.5 to 1.5%,

Mn is an element effective for securing hardenability and is included in a content of 0.5 to 1.5% in range. The lower limit value of the Mn content is preferably 0.5% or more, more preferably 0.7% or more. On the other hand, if the Mn content is over 1.5%, the strength rises and along with this the ductility falls and the deformability deteriorates, so the upper limit value is preferably 1.5% or less, more preferably 1.35% or less. Further, if the Mn content increases, reaction products easily form at the electric resistance weld zone of the electric resistance welded steel pipe and the electric resistance weld zone deteriorates in quality, so the upper limit value is more preferably made 1.3% or less.

Ca: 0.0010 to 0.0030%,

Ca is an important element. It forms sulfides (CaS) at the base material and weld zone and suppresses formation of manganese sulfide (MnS) and is extremely effective for improvement of the deformability. Therefore, the Ca content is made 0.0010 to 0.0030%. Here, if the Ca content is less than 0.0010%, the effect is insufficient, so the lower limit value is preferably made 0.0010% or more, more preferably 0.0015% or more.

On the other hand, if excessively adding over 0.0030% of calcium, the inclusions in the steel increase and deterioration of the deformability is incurred, so the upper limit value is preferably made 0.0030% or less, more preferably 0.0027% or less, still more preferably 0.0025% or less.

O: 0.0005 to 0.0050%

O is an impurity which is unavoidably contained in the steel and has a content of 0.0005 to 0.0050%. To make the O content less than 0.0005%, the production costs would end up rising, so the lower limit is preferably made 0.0005% or more, more preferably 0.0015% or more.

On the other hand, O forms oxides in steel. If the content is over 0.0050%, the deformability and the fatigue properties after quenching fall, so the upper limit is preferably made 0.0050% or less, more preferably 0.0035% or less.

S: 0.0005 to 0.0050%

S is an impurity which is unavoidably contained in the steel and has a content of 0.0005 to 0.0050%. To make the S content less than 0.0005%, the production costs would end up rising, so the lower limit is preferably made 0.0005% or more, more preferably 0.0020% or more, still more preferably 0.0025% or more.

On the other hand, S forms sulfides in steel. If the content is over 0.0050%, the deformability and the fatigue properties after quenching fall, so the upper limit is preferably made 0.0050% or less, more preferably 0.0045% or less, still more preferably 0.0040% or less.

Al: 0.050% or less

Al acts as a deoxidizing element, but if the content of Al exceeds 0.050%, the amount of inclusions increases, the cleanliness of the steel is reduced, and deterioration of the deformability is incurred. For this reason, the content of Al is preferably as small as possible. It is preferably limited to 0.050% or less, more preferably 0.030% or less, and still more preferably 0.025% or less.

P: 0.020% or less,

P is an impurity which is unavoidably contained in steel, causes grain boundary segregation and center segregation, and becomes a cause of deterioration of ductility. Therefore, the content of P is preferably limited to 0.020% or less, more preferably 0.010% or less, still more preferably 0.008% or less.

N: 0.0050% or less,

N is an element which is unavoidably included in steel. If including over 0.0050%, coarse carbides are produced and a drop in the deformability and fatigue strength is incurred. Therefore, the content of nitrogen is preferably limited to 0.0050% or less, more preferably to 0.035% or less. Note that when N is bonded with Al, Ti, Nb, etc. to form fine nitrides and improve the strength and fatigue strength, it is preferable to include 0.0010% or more, more preferably 0.0020% or more.

For the steel pipes in the present invention, steel of the above composition was used, but this steel may have the following elements added to it so as to further improve the hardenability and increase the strength.

Mo is an element which is effective from the viewpoint of securing hardenability and, furthermore, suppressing grain boundary cracks of P at the electric resistance weld zone and base material part. To further obtain such effects, it is preferably included in an amount of 0.25% or less in range.

To sufficiently obtain the effect of Mo, 0.05% or more is preferable, 0.06% or more is more preferable, and 0.08% or more is still more preferable.

On the other hand, if the amount of Mo is over 0.25%, the strength becomes high and deterioration of the deformability and machineability is incurred, so as an upper limit value, 0.25% or less is preferable and 0.17% or less is more preferable. Further, to improve the deformability, the upper limit value of the amount of Mo is more preferably made 0.15% or less.

Note that Mo is an expensive element, so if considering the cost and adding less than 0.05%, addition together with B and Cr enables improvement of the hardenability with even a small amount of addition, so this is preferable.

To further improve the hardenability, it is preferable to simultaneously include Ti and B.

Ti is strong in affinity with N, prevents the precipitation of nitrides (BN) when adding B, and ensures solute B, so it is preferable to add it along with B. However, if excessively adding Ti, the formation of coarse nitrides causes a drop in the deformability and fatigue strength, so the upper limit is preferably made 0.030% or less. Further, titanium forms carbonitrides and contributes to increase fineness of the crystal grains, so it is preferable to add 0.005% or more. Note that to suppress formation of nitrides (BN), it is preferable to suitably control the Ti content in accordance with the N content.

B is an element effective for securing hardenability, but even if adding over 0.0050%, the effect is saturated. Therefore, the upper limit of the content of boron is preferably 0.0050% or less. To improve the hardenability, it is preferable to add boron in an amount of 0.0005% or more.

Further, to raise the strength, it is preferable to add one or more of Ni, Cu, Cr, Mo, Nb, and V.

Ni is an element which is useful for securing hardenability, but if the content of Ni is over 1.00%, the strength becomes high and deterioration of the deformability is incurred. Therefore, the Ni content is preferably 1.00% or less. To raise the hardenability, it is preferable to add 0.05% or more of Ni.

Cu is an element which raises the strength by solution strengthening and precipitation strengthening and contributes to the improvement of the hardenability. However, if the content of Cu is over 1.00%, the deformation resistance at the time of hot working becomes larger and production becomes difficult. Therefore, the content of Cu is preferably made 1.00% or less. Further, to raise the strength, Cu is preferably made 0.05% or more.

Cr is an element effective for securing hardenability, but if the content of Cr is over 1.50%, the strength rises and deterioration of the deformability is incurred. Therefore, the Cr content is preferably 1.50% or less. To raise the hardenability, it is preferable to add 0.05% or more of Cr. To improve the deformability, the Cr content is preferably made 1.00% or less.

Nb is an element effective for securing the hardenability, but even if adding over 0.050%, the effect becomes saturated. Therefore, the content of Nb is preferably made 0.050% or less. To improve the hardenability, it is preferable to add Nb in 0.005% or more.

V is an element which forms carbides and nitrides and is effective for raising the strength. On the other hand, if excessively adding V, it forms coarse carbides and nitrides and thereby invites a drop in the deformability and fatigue strength, so the upper limit of the content is preferably made 0.040% or less. To raise the strength, it is preferable to add V in an amount of 0.005% or more.

In the present invention, to raise the deformability and fatigue properties after quenching, the contents of S and O and the amount of addition of Ca are made suitable in relationship and the average particle size and density of distribution of the calcium-based oxides (CaO) and sulfides (CaS) in the steel are limited to suitable ranges.

If there are coarse oxides and sulfides present in the electric resistance weld zone of electric resistance welded steel pipe, they become starting points of cracks at the time of working and fatigue failure. In particular, the inventors investigated the cause of deterioration of the deformability and the cause of fatigue failure of electric resistance welded steel pipe to which Ca is added. As a result, they discovered that inclusions in the base material and electric resistance weld zone, in particular, CaO, CaS, and other calcium-based inclusions, form starting points for cracks etc.

Therefore, the inventors studied control of the morphology of CaO, CaS, and other calcium-based inclusions. As a result, it is necessary to make the calcium-based inclusions as fine as possible and also lower the density of distribution. For this purpose, it was learned that the relationship between the contents of S and O and the amount of addition of Ca and the average particle size and density of distribution of the calcium-based inclusions are important.

Regarding the relationship between the contents of S and O and the amount of addition of Ca, it is necessary that the E value, defined by the following formula (1), satisfy a specific range. Here, the E value is the ratio of the Ca content to the S content required for immobilizing the S as CaS considering that Ca forms oxides. That is, it is the ratio of the Ca content, S content, and O content when calcium-based oxides and sulfides are formed.

If this E value is less than 0.10, the S content is excessive, so the cleanliness of steel falls and sulfides become the starting point of cracks at the time of working and fatigue cracks after quenching. On the other hand, if the E value exceeds 2.50, it is necessary to greatly reduce the S content. There is an accompanying rise in the production cost.

Therefore, the E value is made 0.10 to 2.50 in range. Note that, to improve the deformability, the E value is preferably 0.25 or more, more preferably 0.30 or more. Further, from the viewpoint of the production costs, the E value is preferably 1.0 or less.

$$E \text{ value} = [Ca](1-124[O])/1.25[S] \qquad (1)$$

where, in the above formula (1), [Ca], [O], and [S] show the contents of Ca, O, and S (mass %) included in electric resistance welded steel pipe.

In the past, the contents of O and S were not strictly adjusted. In the present invention, in the steelmaking process, desulfurization is used to reduce the amount of S, Si, Mn, Al, and other deoxidizing elements are added to reduce the amount of O in the molten steel, and further Ca is added and the parameter E value is controlled in accordance with the amount of S and the amount of O.

For the average particle size and density of distribution of the calcium-based inclusions, from the viewpoint of the deformability and fatigue properties, the average particle size of the calcium-based inclusions has to be made 1.0 to 10 µm and the density has to be made 3 to 300 per 1 mm² in the base material part and electric resistance weld zone of the electric resistance welded steel pipe.

By making the average particle size of the calcium-based inclusions 10 µm or less and making the density 300/mm², the deformability and the fatigue properties after quenching are strikingly improved.

On the other hand, to make the average particle size less than 1.0 µm and make the density less than 3/mm², it is necessary to reduce the S content and oxygen (O) content in the steel, so the production costs rise. From the viewpoint of the production costs, the preferable lower limit of the average particle size of the calcium-based inclusions is 1.1 µm or more.

If left in the state hardened by electric resistance welding and not performing heat treatment after quenching, the electric resistance weld zone becomes a mainly martensite microstructure and the hardness of the electric resistance weld zone becomes higher compared with the base material part.

To secure the deformability in the state of the pipe as produced, it is necessary that the difference (ΔHv) of the maximum hardness of the electric resistance weld zone and the average hardness of the base material part, measured by Vicker's hardness, satisfy the relationship $$100 \leq \Delta Hv \leq 500.$$

If, in the state where the pipe is produced, the difference (ΔHv) of the maximum hardness of the electric resistance weld zone and the average hardness of the base material part is large, strain concentrates at the base material part of the soft phase near the electric resistance weld zone at the time of working, and as a result local deformation proceeds and fracture results. To prevent such breakage, it is necessary to make the difference ΔHv of the thickness 500 or less.

The electric resistance weld zone in the state of the pipe as produced became a microstructure mainly comprised of martensite as explained above. The hardness mainly depends on the amount of C and other chemical components of the steel, the specific input heat of the electric resistance welding (amount of welding power per unit length), base material plate thickness, etc. In general, the higher the amount of C or the carbon equivalent, the higher the maximum hardness of the electric resistance weld zone. Further, it is known that the smaller the specific input heat and further the greater the plate thickness, the higher the maximum hardness of the electric resistance weld zone.

However, the chemical components and plate thickness of the base material have an effect on the product characteristics after working the electric resistance welded steel pipe into a part and cannot be freely selected. Therefore, the specific input heat is selected and the maximum hardness of the weld zone is adjusted to give an ΔHv of 500 or less in accordance with the chemical components and plate thickness of the base material.

Further, the value of ΔHv becomes smaller along with the drop in the amount of C of the base material, so the lower limit of ΔHv need not be particularly prescribed, but considering the realistically possible specific input heat and base material plate thickness and the value of ΔHv in the lower limit region of C: 0.15%, it is made 100 or more.

In general, the thickness of electric resistance welded steel pipe is 1.5 to 15 mm. Note that the thickness of the hollow parts used for shafts of auto parts etc. is large. It is preferable to make the thickness of the electric resistance welded steel pipe forming the material 4 mm or more. Further, the electric resistance welded steel pipe used as the material for an auto part or machine structure part has a small outside diameter, so if the thickness increases, shaping and electric resistance welding become difficult. Therefore, the upper limit of the thickness of the electric resistance welded steel pipe is preferably 12 mm or less.

The present invention was made as explained above, but below examples will be used to further explain the deformability and effects of the present invention.

Note that the conditions used in the examples are just illustrations of the conditions for confirmation purposes. The present invention is not limited to the examples.

EXAMPLE 1

Using the Steels A to O having the chemical components shown in Table 1, electric resistance welded steel pipes 1 to 15 having outside diameters of 38.1 mm and thicknesses of 8.0 mm were produced. Note that after electric resistance welding, induction quenching was performed, but after the quenching, no normalizing or other heat treatment was performed.

The Vicker's hardnesses of the weld zones and base material parts of the electric resistance welded steel pipes in the state of the pipe as produced were measured and the maximum hardness of the electric resistance weld zones and average hardness of the base material parts were found. Along with this, test pieces were cut out from the electric resistance welded steel pipes and were observed at their cross-sections and tested to evaluate their properties.

The size and number of inclusions were measured by cutting out samples from the electric resistance weld zone and base material part of electric resistance welded steel pipe and polishing them to mirror finishes. EPMA was used to measure 1000 µm×1000 µm measurement areas at 1000× 1000 points, then the densities of calcium-based inclusions of the base material and weld zone of the electric resistance welded steel pipe were found. Further, SEM photographs were analyzed by image analysis and the average particle size of the calcium-based inclusions was found converted into a circle equivalent diameter.

The deformability was evaluated by the compression test. A cylindrical test piece with a diameter of 7 mm and a length of 10 mm was obtained so that the axial direction of the electric resistance welded steel pipe became the longitudinal direction (L direction) of the compression test piece. The height of the test piece when compressing the test piece in the L direction and cracks appeared at the surface was used as the compression height "h".

Note that the compression height "h" changes depending on the test conditions (size of test piece, strain rate, etc.) Under the conditions of the present embodiment, the deformability was evaluated as good when the compression height was 2.0 mm or less.

The fatigue properties after quenching were evaluated by a torsional fatigue test. The torsional fatigue test comprised cooling the electric resistance welded steel pipe from the outer side by water so as to harden it, then fixing the rotational torque at 13 kNm and evaluating the number of repetitions.

Note that the "number of repetitions" changes depending on the test conditions. Under the conditions of the present embodiment, if the number of repetitions becomes $1.5 \times 10^8$ or more, the fatigue properties after quenching were evaluated as good.

The results are shown in Table 2. As shown in Table 2, the Invention Example Steel Pipes 1 to 11 produced using the Steels A to K have a difference ΔH of the Vicker's hardness of the weld zone and base material part within the range of the present invention and have good deformability by a compression test and fatigue properties after quenching by a torsional fatigue test. On the other hand, the Comparative Example Steel Pipes 12 to 15 produced using the Steels L to O all have chemical components and an average particle size and number density of the calcium-based inclusions outside the range of the present invention, so are inferior in deformability and fatigue properties after quenching.

The Comparative Example Steel L has a low C content, so the hardenability falls and the strength after quenching becomes lower, so the Steel Pipe 12 produced using this steel is inferior in fatigue properties after quenching.

The Comparative Example Steel M has a high S content, so the produced Steel Pipe 13 has a high number density of calcium-based inclusions of the electric resistance weld zone and base material part, the calcium-based inclusions form starting points of cracks in the compression test and torsional fatigue test, and the deformability and fatigue properties after hardenability become inferior.

The Comparative Example Steel N has an excessive Ca content and a high E value, so the produced Steel Pipe 14 has a high number density of the calcium-based inclusions of the electric resistance weld zone and base material part and similarly the deformability and the fatigue properties after quenching are inferior.

The Comparative Example Steel O has a low Ca content and a low E value, so the calcium-based inclusions of the electric resistance weld zone and base material part of the produced Steel Pipe 15 are coarse, the number density also becomes high, and similarly the deformability and the fatigue properties after quenching are inferior.

TABLE 1

| Steel No. | Components (mass %) | | | | | | | | |
|---|---|---|---|---|---|---|---|---|---|
| | C | Si | Mn | P | S | Al | N | O | Ca |
| A | 0.48 | 0.25 | 0.70 | 0.007 | 0.0040 | 0.030 | 0.0035 | 0.0015 | 0.0020 |
| B | 0.45 | 0.20 | 1.31 | 0.006 | 0.0045 | 0.030 | 0.0030 | 0.0020 | 0.0025 |
| C | 0.30 | 0.10 | 1.30 | 0.009 | 0.0040 | 0.025 | 0.0025 | 0.0015 | 0.0020 |
| D | 0.20 | 0.15 | 1.00 | 0.008 | 0.0025 | 0.003 | 0.0030 | 0.0035 | 0.0015 |
| E | 0.45 | 0.25 | 0.70 | 0.007 | 0.0035 | 0.030 | 0.0035 | 0.0015 | 0.0027 |
| F | 0.45 | 0.25 | 0.70 | 0.007 | 0.0035 | 0.030 | 0.0037 | 0.0012 | 0.0028 |
| G | 0.35 | 0.20 | 1.35 | 0.007 | 0.0020 | 0.030 | 0.0020 | 0.0015 | 0.0025 |
| H | 0.25 | 0.15 | 1.00 | 0.008 | 0.0025 | 0.003 | 0.0030 | 0.0035 | 0.0015 |
| I | 0.23 | 0.15 | 1.20 | 0.008 | 0.0025 | 0.003 | 0.0030 | 0.0035 | 0.0015 |
| J | 0.20 | 0.24 | 0.67 | 0.014 | 0.0020 | 0.003 | 0.0025 | 0.0020 | 0.0015 |
| K | 0.20 | 0.24 | 0.70 | 0.010 | 0.0020 | 0.025 | 0.0025 | 0.0015 | 0.0020 |
| L | 0.12 | 0.20 | 0.55 | 0.007 | 0.0020 | 0.028 | 0.0025 | 0.0030 | 0.0028 |
| M | 0.45 | 0.20 | 0.55 | 0.008 | 0.0092 | 0.025 | 0.0030 | 0.0025 | 0.0020 |
| N | 0.48 | 0.20 | 0.70 | 0.008 | 0.0010 | 0.030 | 0.0035 | 0.0030 | 0.0050 |
| O | 0.35 | 0.25 | 1.00 | 0.009 | 0.0045 | 0.030 | 0.0028 | 0.0045 | 0.0008 |

| Steel No. | Components (mass %) | | | | | | | | E value | Remarks |
|---|---|---|---|---|---|---|---|---|---|---|
| | Mo | Ti | B | Ni | Cu | Cr | Nb | V | | |
| A | | | | | | | | | 0.33 | Inv. ex. |
| B | | | | | | | | | 0.33 | |
| C | | | | | | | | | 0.33 | |
| D | | | | | | | | 0.030 | 0.27 | |
| E | | | | | | | | | 0.50 | |
| F | 0.03 | 0.019 | 0.0013 | | | | | | 0.54 | |
| G | | 0.025 | 0.0020 | | | 0.12 | | | 0.81 | |
| H | | | | 0.50 | 0.30 | | | | 0.27 | |
| I | | | | | | | 0.030 | | 0.27 | |
| J | | | | | | 1.13 | | | 0.45 | |
| K | 0.04 | | | | | 1.00 | | | 0.65 | |
| L | | | | | | | | | 0.70 | Comp. ex. |
| M | | | | | | | | | 0.12 | |
| N | | | | | | | | | 2.51 | |
| O | | | | | | | | | 0.06 | |

Blank fields mean intentionally not added (same in Table 3 as well).
Underlines mean outside the range of the present invention (same for Tables 2 to 4).

TABLE 2

| | | Ca-based inclusions | | | | Compression test Compression | | Torsional fatigue properties | | | |
|---|---|---|---|---|---|---|---|---|---|---|---|
| | | Particle size (μm) | | Density (/mm²) | | height h (mm) | | Rotational | | | |
| Steel pipe No. | Steel No. | Weld zone | Base material | Weld zone | Base material | Weld zone | Base material | torque (kNm) | Repetitions (×10⁶) | ΔHv | Remarks |
| 1 | A | 6.1 | 5.9 | 205 | 180 | 1.8 | 1.7 | 1.3 | 1.9 | 449 | Inv. ex. |
| 2 | B | 6.0 | 5.8 | 210 | 205 | 1.9 | 1.8 | 1.3 | 2.1 | 448 | |
| 3 | C | 5.5 | 5.2 | 110 | 105 | 1.7 | 1.6 | 1.3 | 1.7 | 362 | |
| 4 | D | 3.7 | 3.7 | 60 | 50 | 1.2 | 1.1 | 1.3 | 1.5 | 299 | |

TABLE 2-continued

| Steel pipe No. | Steel No. | Ca-based inclusions | | | | Compression test Compression height h (mm) | | Torsional fatigue properties | | ΔHv | Remarks |
|---|---|---|---|---|---|---|---|---|---|---|---|
| | | Particle size (μm) | | Density (/mm²) | | | | Rotational torque (kNm) | Repetitions (×10⁶) | | |
| | | Weld zone | Base material | Weld zone | Base material | Weld zone | Base material | | | | |
| 5 | E | 6.2 | 6.0 | 210 | 180 | 1.8 | 1.7 | 1.3 | 1.8 | 458 | |
| 6 | F | 4.2 | 4.0 | 90 | 90 | 1.4 | 1.4 | 1.3 | 2.6 | 438 | |
| 7 | G | 3.7 | 3.6 | 70 | 65 | 1.3 | 1.2 | 1.3 | 2.2 | 392 | |
| 8 | H | 4.0 | 3.9 | 85 | 80 | 1.1 | 1.0 | 1.3 | 1.5 | 331 | |
| 9 | I | 3.5 | 3.2 | 60 | 40 | 1.3 | 1.3 | 1.3 | 1.6 | 319 | |
| 10 | J | 3.5 | 3.3 | 75 | 60 | 1.3 | 1.3 | 1.3 | 1.8 | 289 | |
| 11 | K | 4.3 | 4.2 | 100 | 90 | 1.4 | 1.4 | 1.3 | 2.0 | 299 | |
| 12 | L | 3.5 | 3.2 | 67 | 60 | 1.2 | 1.2 | 1.3 | 0.3 | 300 | Comp. ex. |
| 13 | M | 7.4 | 6.1 | 335 | 320 | 2.7 | 2.6 | 1.3 | 0.7 | 428 | |
| 14 | N | 7.9 | 6.7 | 350 | 315 | 3.1 | 3.0 | 1.3 | 0.6 | 429 | |
| 15 | O | 12.1 | 11.8 | 530 | 520 | 5.0 | 4.8 | 1.3 | 0.5 | 382 | |

ΔHv: Difference of maximum hardness of electric resistance weld zone and average hardness of base material part (same for Table 4)

EXAMPLE 2

Using the Steels A1 to O1 having the chemical components shown in Table 3, Electric Resistance Welded Steel Pipes 16 to 30 of the same shape as in Example 1 were produced in the same way as Example 1.

The Vicker's hardnesses of the weld zones and base material parts of the Electric Resistance Welded Steel Pipes 16 to 30 were measured and the maximum hardness of the electric resistance weld zones and average hardness of the base material part were found. Along with this, test pieces were cut out from the electric resistance weld zones and base material parts. In the same way as Example 1, the density and average particle size of the base material and weld zone of the electric resistance welded steel pipes were found.

Further, in the same way as in Example 1, tests were run to evaluate the deformability and the fatigue properties after quenching.

The results are shown in Table 4. As shown in Table 4, the Invention Example Steel Pipes 16 to 26 produced using the Steels A1 to K1 have differences ΔH of the Vicker's hardness of the weld zone and base material part within the range of the present invention and also are good in deformability by a compression test and fatigue properties after quenching by a torsional fatigue test. On the other hand, the Comparative Example Steel Pipes 27 to 30 produced using the Steels L1 to O1 have chemical components and calcium-based inclusions with average particle sizes and number densities outside the range of the present invention, so are inferior in deformability and fatigue properties after quenching.

The Comparative Example Steel L1 has a low amount of C and inferior hardenability. The Steel Pipe 27 after quenching produced using this steel was inferior in fatigue properties. The Comparative Example Steel M1 has a high amount of S, the Steel N1 has an excessive amount of Ca and while is high in E value, is high in number density of Ca-based inclusions of the electric resistance weld zone and base material part of the produced Steel Pipes 28 and 29.

Further, the Comparative Example Steel O1 has a low E value, so the Ca-based inclusions of the electric resistance weld zone and base material part of the produced Steel Pipe 30 become high in number density. For this reason, the Comparative Example Steel Pipes 28 to 30 using the Steels M, N, and O had Ca-based inclusions forming starting points of cracking in the compression test and fatigue test, that is, had inferior deformability and fatigue properties.

TABLE 3

| Steel No. | Components (mass %) | | | | | | | | |
|---|---|---|---|---|---|---|---|---|---|
| | C | Si | Mn | P | S | Al | N | O | Ca |
| A1 | 0.45 | 0.25 | 0.70 | 0.007 | 0.0040 | 0.030 | 0.0035 | 0.0015 | 0.0020 |
| B1 | 0.45 | 0.20 | 1.30 | 0.006 | 0.0045 | 0.030 | 0.0030 | 0.0020 | 0.0025 |
| C1 | 0.35 | 0.20 | 1.35 | 0.007 | 0.0020 | 0.030 | 0.0020 | 0.0015 | 0.0025 |
| D1 | 0.30 | 0.10 | 1.30 | 0.009 | 0.0040 | 0.025 | 0.0025 | 0.0015 | 0.0020 |
| E1 | 0.25 | 0.15 | 1.00 | 0.008 | 0.0025 | 0.003 | 0.0030 | 0.0035 | 0.0015 |
| F1 | 0.40 | 0.25 | 0.70 | 0.007 | 0.0035 | 0.030 | 0.0035 | 0.0015 | 0.0027 |
| G1 | 0.35 | 0.20 | 1.35 | 0.007 | 0.0020 | 0.030 | 0.0020 | 0.0015 | 0.0025 |
| H1 | 0.20 | 0.24 | 0.70 | 0.010 | 0.0020 | 0.025 | 0.0025 | 0.0015 | 0.0020 |
| I1 | 0.25 | 0.15 | 1.00 | 0.008 | 0.0025 | 0.003 | 0.0030 | 0.0035 | 0.0015 |
| J1 | 0.23 | 0.15 | 1.20 | 0.008 | 0.0025 | 0.003 | 0.0030 | 0.0035 | 0.0015 |
| K1 | 0.35 | 0.20 | 1.35 | 0.007 | 0.0020 | 0.030 | 0.0020 | 0.0015 | 0.0025 |
| L1 | 0.13 | 0.20 | 0.55 | 0.007 | 0.0020 | 0.028 | 0.0025 | 0.0030 | 0.0028 |
| M1 | 0.45 | 0.20 | 0.55 | 0.008 | 0.0090 | 0.025 | 0.0030 | 0.0025 | 0.0020 |
| N1 | 0.45 | 0.20 | 0.70 | 0.008 | 0.0010 | 0.030 | 0.0035 | 0.0030 | 0.0050 |
| O1 | 0.35 | 0.25 | 1.00 | 0.009 | 0.0045 | 0.030 | 0.0028 | 0.0040 | 0.0008 |

TABLE 3-continued

| Steel No. | Components (mass %) | | | | | | | | E value | Remarks |
|---|---|---|---|---|---|---|---|---|---|---|
| | Mo | Ti | B | Ni | Cu | Cr | Nb | V | | |
| A1 | 0.06 | | | | | | | | 0.33 | Inv. ex. |
| B1 | 0.05 | | | | | | | | 0.33 | |
| C1 | 0.08 | | | | | | | | 0.81 | |
| D1 | 0.10 | | | | | | | | 0.33 | |
| E1 | 0.12 | | | | | | | | 0.27 | |
| F1 | 0.06 | 0.020 | 0.0015 | | | | | | 0.50 | |
| G1 | 0.06 | 0.025 | 0.0030 | | | 0.10 | | | 0.81 | |
| H1 | 0.17 | | | | | 1.15 | | | 0.65 | |
| I1 | 0.12 | | | 0.50 | 0.30 | | | | 0.27 | |
| J1 | 0.10 | | | | | | 0.030 | | 0.27 | |
| K1 | 0.06 | | | | | | | 0.030 | 0.81 | |
| L1 | 0.06 | | | | | | | | 0.70 | Comp. ex. |
| M1 | 0.07 | | | | | | | | 0.12 | |
| N1 | 0.07 | | | | | | | | 2.51 | |
| O1 | 0.10 | | | | | | | | 0.07 | |

TABLE 4

| Steel pipe No. | Steel No. | Ca-based inclusions | | | | Compression test Compression | | Torsional fatigue properties | | ΔHv | Remarks |
|---|---|---|---|---|---|---|---|---|---|---|---|
| | | Particle size (μm) | | Density (/mm²) | | height h (mm) | | Rotational torque (kNm) | Repetitions (×10⁶) | | |
| | | Weld zone | Base material | Weld zone | Base material | Weld zone | Base material | | | | |
| 16 | A1 | 6.2 | 6.0 | 210 | 180 | 1.8 | 1.7 | 1.3 | 1.8 | 428 | Inv. ex. |
| 17 | B1 | 6.0 | 5.8 | 220 | 200 | 1.9 | 1.8 | 1.3 | 2.0 | 408 | |
| 18 | C1 | 5.5 | 5.2 | 110 | 105 | 1.7 | 1.6 | 1.3 | 1.7 | 392 | |
| 19 | D1 | 3.8 | 3.7 | 60 | 40 | 1.2 | 1.1 | 1.3 | 1.6 | 362 | |
| 20 | E1 | 4.0 | 3.9 | 85 | 80 | 1.1 | 1.0 | 1.3 | 1.5 | 331 | |
| 21 | F1 | 4.2 | 4.0 | 90 | 90 | 1.4 | 1.4 | 1.3 | 2.6 | 411 | |
| 22 | G1 | 3.7 | 3.6 | 70 | 65 | 1.3 | 1.2 | 1.3 | 2.2 | 387 | |
| 23 | H1 | 4.3 | 4.2 | 100 | 90 | 1.4 | 1.4 | 1.3 | 1.8 | 289 | |
| 24 | I1 | 3.3 | 3.1 | 85 | 75 | 1.2 | 1.1 | 1.3 | 1.7 | 331 | |
| 25 | J1 | 3.5 | 3.2 | 60 | 40 | 1.3 | 1.3 | 1.3 | 1.6 | 319 | |
| 26 | K1 | 3.2 | 3.2 | 65 | 35 | 1.4 | 1.2 | 1.3 | 1.9 | 392 | |
| 27 | L1 | 3.4 | 3.2 | 65 | 60 | 1.2 | 1.2 | 1.3 | 0.4 | 308 | Comp. ex. |
| 28 | M1 | 7.3 | 6.1 | 330 | 310 | 2.7 | 2.6 | 1.3 | 0.7 | 428 | |
| 29 | N1 | 7.9 | 6.8 | 350 | 320 | 3.1 | 3.0 | 1.3 | 0.6 | 423 | |
| 30 | O1 | 12.0 | 11.8 | 550 | 530 | 5.0 | 4.8 | 1.3 | 0.5 | 382 | |

The invention claimed is:

1. An electric resistance welded steel pipe comprising, by mass %,
C: 0.30 to 0.55%,
Si: 0.01 to 0.30%,
Mn: 0.5 to 1.5%,
Ca: 0.0010 to 0.0030%,
S: 0.0005 to 0.0050%, and
O: 0.0005 to 0.0050%,
restricting
P: 0.020% or less,
N: 0.0050% or less, and
Al: 0.050% or less,
having a balance of Fe and impurities,
having contents of Ca, O, and S satisfying $$0.10 \leq [Ca](1-124[O])/1.25[S] \leq 2.50,$$

having Ca-based inclusions present at a base material and electric resistance weld zone with an average particle size of 1.0 to 10 μm and density of 3 to 300/mm², and
having a difference ΔHv of a maximum hardness of the electric resistance weld zone and average hardness of a base material part of 100≤ΔHv≤500, wherein:
heat treatment of the welded steel pipe is not performed after pipe-making, and
the welded steel pipe is in a state of the pipe as-produced, without performing heat treatment.

2. The electric resistance welded steel pipe as set forth in claim 1, further comprising, by mass, Mo: 0.25% or less.

3. The electric resistance welded steel pipe as set forth in claim 1 or 2, further comprising, by mass %, Ti: 0.030% or less and B: 0.0050% or less.

4. The electric resistance welded steel pipe as set forth in claim 1 or 2, further comprising, by mass %, one or more of Ni: 1.00% or less, Cu: 1.00% or less, Cr: 1.50% or less, Mo: less than 0.05%, Nb: 0.050% or less, and V: 0.040% or less.

5. The electric resistance welded steel pipe as set forth in claim 1 or 2, wherein the base material has a thickness of 4 to 12 mm.

6. The electric resistance welded steel pipe as set forth in claim 1, wherein the content of C is 0.35 to 0.55%.

* * * * *